United States Patent
Nehowig et al.

[11] Patent Number: 5,823,689
[45] Date of Patent: Oct. 20, 1998

[54] COMPUTER SYSTEM WITH BI-DIRECTIONAL COMMUNICATION AND METHOD

[75] Inventors: Kelly R. Nehowig, Maple Grove; Scott W. Kullman, Plymouth; Douglas R. Kremers, Maple Grove, all of Minn.

[73] Assignee: Varitronic Systems, Inc., Minneapolis, Minn.

[21] Appl. No.: 618,216

[22] Filed: Mar. 19, 1996

[51] Int. Cl.[6] .................................................. B41J 3/46
[52] U.S. Cl. ........................................ 400/83; 400/615.2
[58] Field of Search .......................... 400/61, 76, 615.2, 400/68, 83, 207

[56] References Cited

U.S. PATENT DOCUMENTS

| | | | |
|---|---|---|---|
| 5,318,370 | 6/1994 | Nehowig | 400/613 |
| 5,344,247 | 9/1994 | Sakuragi et al. | 400/61 |
| 5,496,119 | 3/1996 | Kawakami et al. | 400/615.2 |
| 5,498,087 | 3/1996 | Wey et al. | 400/61 |
| 5,503,482 | 4/1996 | Kawakami et al. | 400/83 |
| 5,538,352 | 7/1996 | Sugiura | 400/615.2 |

OTHER PUBLICATIONS

Varitronic Systems, Inc., "Label and Sign Maker," pp. 1–4, Software Accessories Technical Data Sheet, 1994.

*Primary Examiner*—Edgar S. Burr
*Assistant Examiner*—Steven S. Kelley
*Attorney, Agent, or Firm*—Merchant, Gould, Smith, Edell, Welter & Schmidt, P.A.

[57] ABSTRACT

The invention provides a computer system utilizing bi-directional communication between a computing device and a printing machine, for transmitting data representing real-time supply roll parameters to an application program on the computing device. Supply roll parameters are stored on a memory circuit component that is connected to a supply roll. The computing device polls the printing machine for the supply roll parameters. The printing machine transmits the supply roll parameters to the computing device and the computing device formats the parameters into a display, proportionately matching the dimensions and color of the actual supply roll. A user can then create and/or edit output files for the specific supply roll loaded in the printing machine, viewing the output exactly as it will be printed.

14 Claims, 7 Drawing Sheets

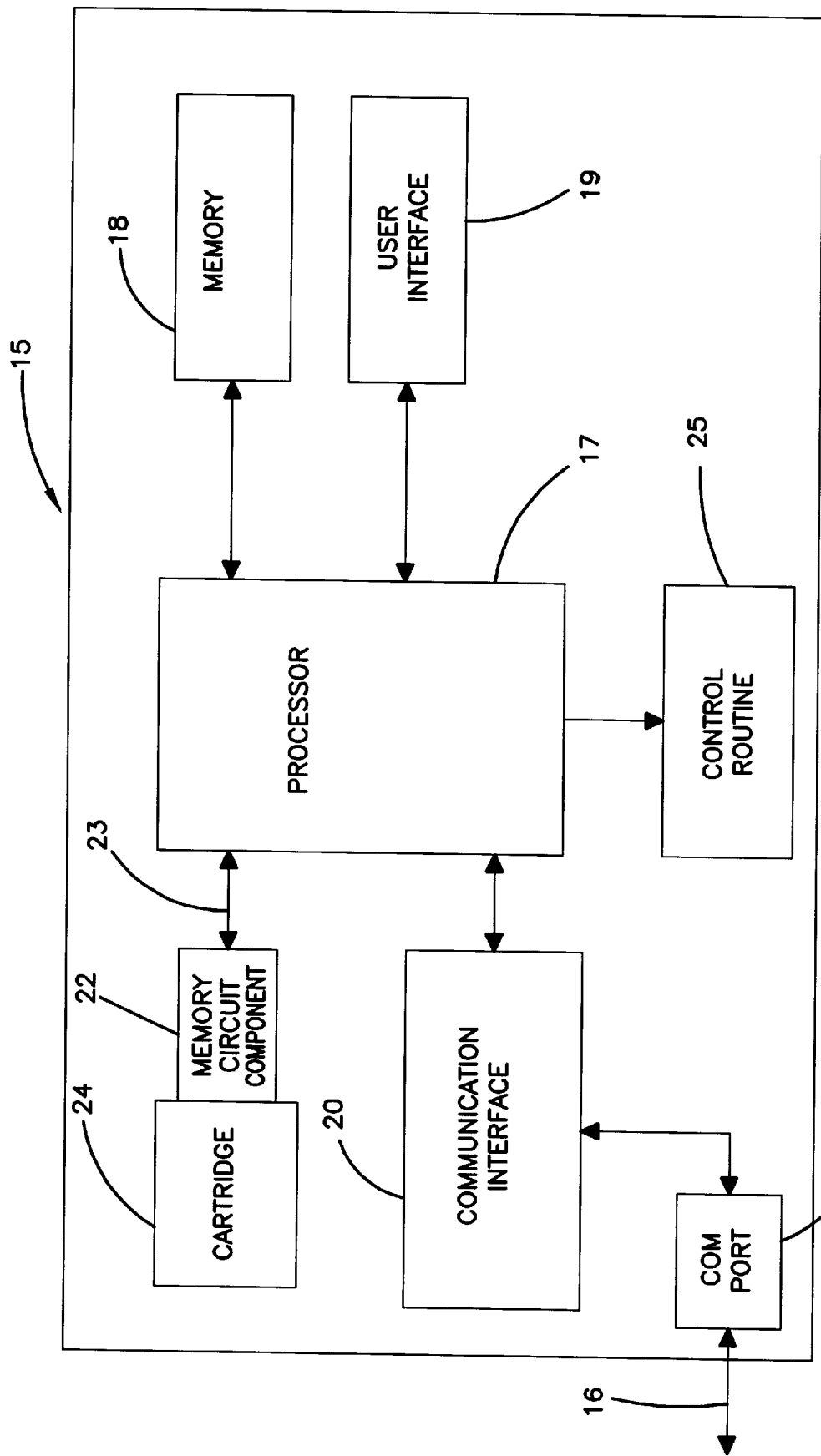

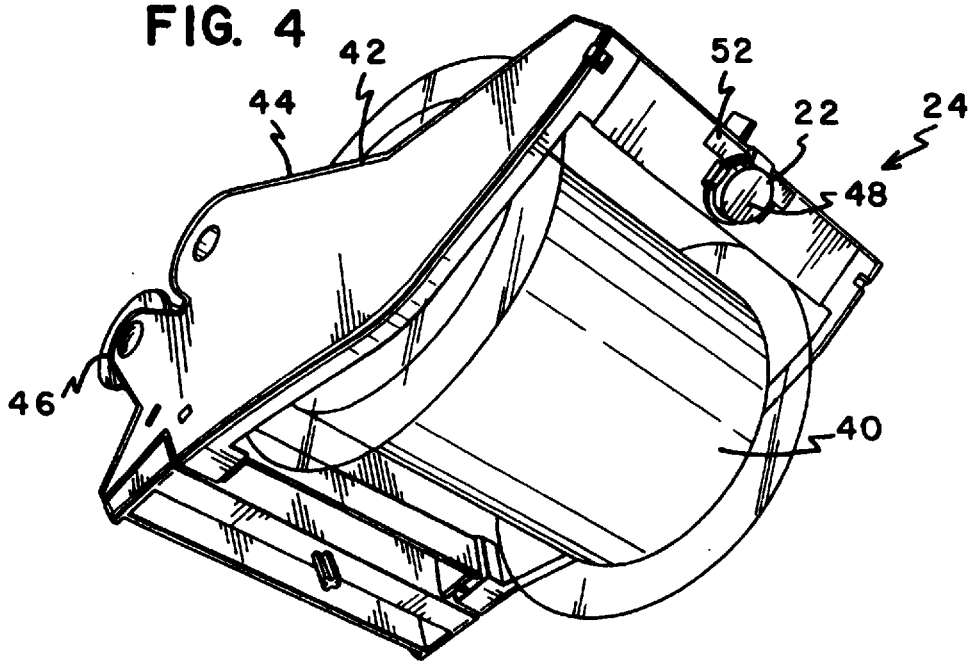
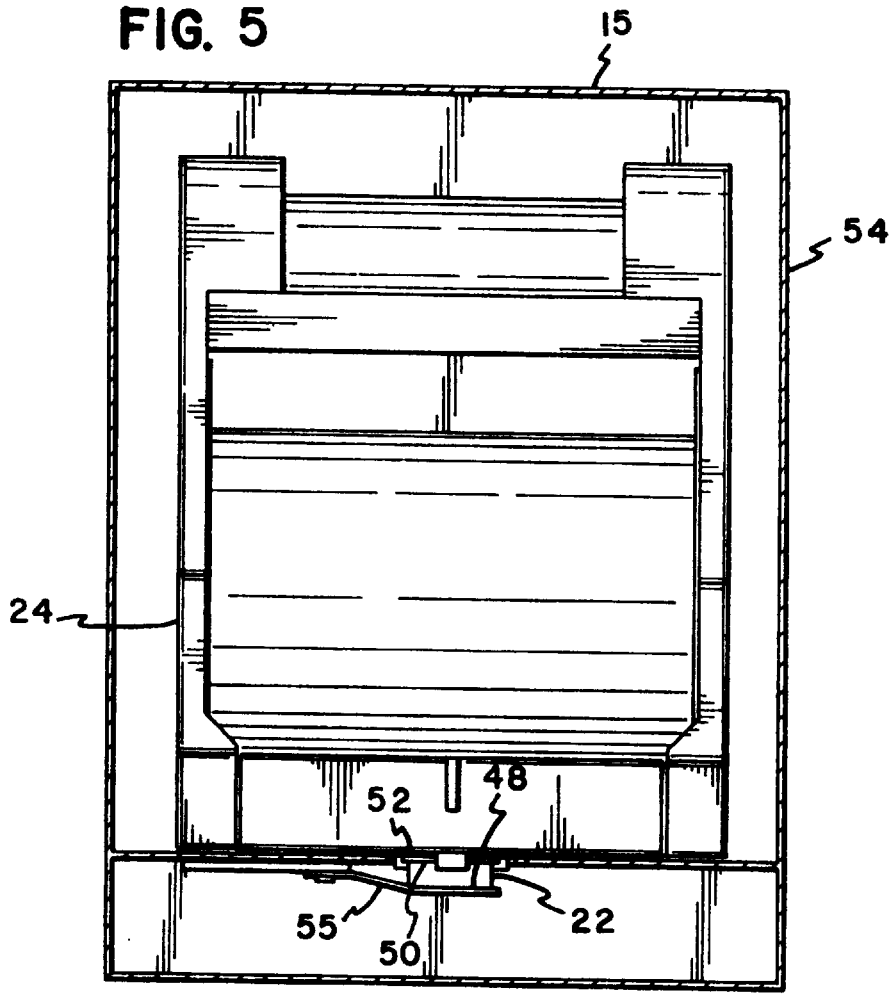

COMPUTER SYSTEM WITH BI-DIRECTIONAL COMMUNICATION AND METHOD

FIELD OF THE INVENTION

The present invention relates to a computer system and more particularly to a computer system using bi-directional communication between a printing machine and a computing device.

BACKGROUND OF THE INVENTION

Many application programs currently exist that can be loaded onto computing devices such as personal computers to enable users to create a desired output file. Such application programs include, for example, word processors for creating textual documents, spreadsheet programs for creating spreadsheets and the like, and graphics programs for creating graphics or combined text and graphics. Typically, the application programs format the desired output file created by the user to be printable to supply rolls of standard 8½"×11" paper. In some applications, however, it is possible and desirable to create output files formatted for other supply rolls having special dimensions and color. For example, other supply rolls may include label rolls, poster rolls, or other specially formatted tape. Currently in such applications, a user must physically check the supply roll loaded in the attached printing machine to determine if it is appropriate for the output file to be printed. The application program cannot tell the user what type of supply roll is loaded in the printing machine.

Many graphics application programs provide generic templates that attempt to match the supply roll loaded in the printing machine. The generic templates are displayed on a computer screen and the user may add text and graphics to the template until a desired output file is produced.

The user can then print the desired output file to the connected printing machine. After the user attempts to print the desired output file, the user then has to check the printing machine and newly printed material. If the supply roll loaded in the printing machine does not match the template displayed on the computer screen while the user created the desired output file, the resulting printed material may have to be discarded, particularly if the supply roll has an inappropriate color or dimensions.

If the output file was not printed to a corresponding supply roll, the user then has to load an appropriate corresponding supply roll in order to print the output file. This sequence of events creates waste because frequently the output file is printed to an inappropriate supply roll and must be discarded. Productivity is also reduced because the user must spend time correcting the supply roll loaded in the printing machine.

This is particularly troublesome in label printer applications where labels are created having a predefined size and desired color. If the label supply roll loaded into the printing machine does not correspond exactly to the labels created in the application program, the printed labels will likely not be usable and will have to be discarded. For example, if labels are being created using a template for 3"×5" labels, but the supply roll is 2"×3" labels, then the printed output may overwrite the boundaries of the 2"×3" labels. Also, there is currently no way for the user to know what color of labels are loaded in the printing machine without physically checking the loaded supply roll.

Another problem may occur in application programs where output files are created for a supply roll having special dimensions or color. If the supply roll is changed in the printing machine while the user is in the process of creating output files, the application program has no means to notify the user or update the user's file. For example, if the supply roll is changed while the user is temporarily away from the computer terminal, the user may not be aware of the change and may ultimately print an old file to the new supply roll, resulting in wasted printing. Also, if a user creates output using one type of supply roll and decides that a different type of supply roll is needed, the user cannot simply load the desired supply roll into the printing machine and automatically update the supply roll format in the output file displayed on the computer screen. A user may need this capability to determine whether the output file corresponds to the new supply roll or whether the output file has to be changed in order to print to the new supply roll.

Therefore, a need exists for a way to view the supply roll loaded into the printing machine within the application program such that a user can create a desired output file utilizing the exact parameters of the loaded supply roll. A need also exists to alert the user when the supply roll loaded in the printing machine has been changed, and to allow a user to update an output file with new supply roll parameters by simply loading the new supply roll into the printing machine. Such needs can be fulfilled by the use of a computer system with bi-directional communication between a computing device and a printing machine of the system. The present invention provides a solution to this and other problems and offers advantages over the prior art.

SUMMARY OF THE INVENTION

The present invention provides a computer system utilizing bi-directional communication between a computing device and a printing machine, for transmitting data representing real-time supply roll parameters to an application program on the computing device allowing users to create output files for the specific supply roll loaded in the printing machine. The present invention addresses the problem of users creating output files within an application program on a computing device and having the output files printed to a supply roll, loaded in the printing machine, when the supply roll has parameters that do not correspond to the output files.

In accordance with a first aspect of the invention, a computer system is provided for creating desired output files utilizing real-time supply roll parameters. This is accomplished by establishing bi-directional communication between a computing device, such as a personal computer, and a printing machine. A programming means is utilized to transmit signals to the printing machine requesting supply roll parameter information. The supply roll parameter data is stored in a memory circuit component that is electrically connected to the printing machine. A printing programming means is utilized in the printing machine to respond to the signals sent from the computing device by transmitting response signals indicative of the real-time supply roll parameters stored on the memory circuit component.

In accordance with another aspect of the invention, a user interface displays supply roll parameter data formatted to proportionately match the actual dimensions and color of the supply roll loaded in the printing machine. The user is then able to add text and graphics through the user interface, which shows the output file as it will appear on the supply roll when the output file is printed.

In addition to the above aspects of the present invention, a method is also provided for accomplishing the described invention.

These and various other features as well as advantages which characterize the present invention will be apparent upon reading the following detailed description and reviewing the associated drawings.

BRIEF DESCRIPTION OF THE DRAWINGS

FIG. 3 is a block diagram of a preferred embodiment printing machine of a computer system according to the present invention;

FIG. 4 is a prospective view of a preferred embodiment cartridge with a supply roll and a memory circuit component for use within a printing machine of the present invention;

FIG. 5 is a front sectional view of the cartridge illustrated in FIG. 4 inserted into a printing machine;

DETAILED DESCRIPTION

Referring to the several figures in which like elements are identically numbered throughout, preferred embodiments of the present invention will now be described.

Figure 1:
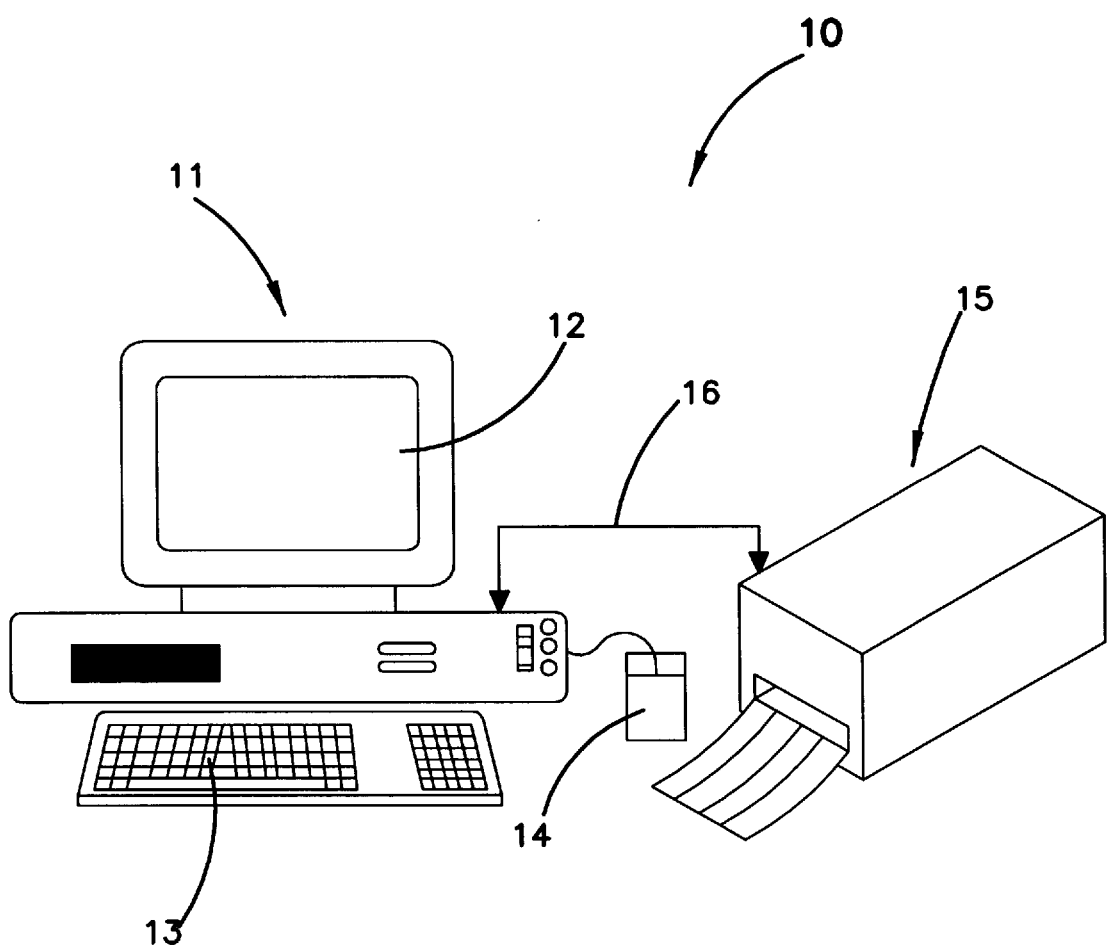
FIG. 1 is a diagram showing a preferred embodiment computer system with bi-directional communication, capable of generating output data with real-time supply roll parameters.

With reference to FIG. 1, a computer system 10 using bi-directional communication between a computing device 11 and a printing machine 15 is illustrated. The computing device 11 is illustrative or exemplary of a personal computer, as commonly understood in the industry. Any computer-based system that can output the appropriate commands, as hereinafter described, may be used as the computing device 11. Generally, the computing device 11 has a screen display 12, a keyboard 13 and a pointing unit 14. The pointing unit 14 can be utilized by a user to generate text or graphics in creating an output file. The pointing unit 14 may be a mouse, trackball, light pen, barcode scanner, digitizing pad, or other comparable device, depending upon the particular application. The computing device 11 is connected to a printing machine 15 by a communication bus 16. In a preferred embodiment, the printing machine 15 is a Varitronics EasyStep™ 4000 printer which is capable of bi-directional communication with the computing device 11.

Figure 2:
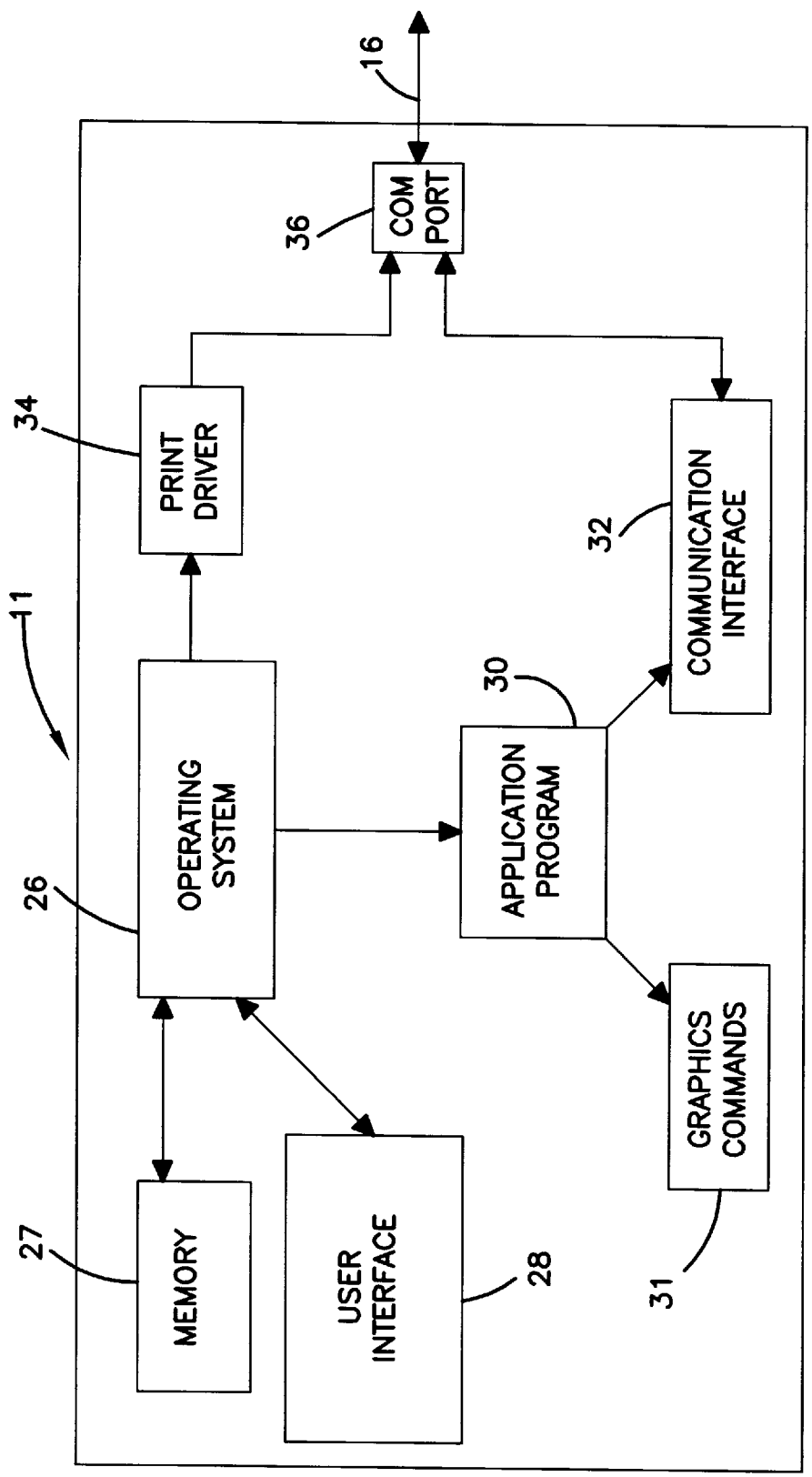
FIG. 2 is a block diagram of a preferred embodiment computing device of a computer system according to the present invention.

With reference to FIG. 2, a block diagram of the pertinent components and interfaces of the computing device 11 is shown. The computing device 11 must have an operating system 26 that runs an application program 30 for implementing the present invention. The application program 30 is stored in a memory 27 which is accessible by the operating system 26. In the preferred embodiment, the application program has graphics commands 31 for allowing users to generate desired output files of graphics, text or combined graphics and text. In a preferred embodiment, the graphics software incorporated as editing commands 31 is Varitronics Graphics Language (VGL). The application program 30 also includes a communication interface 32 for communicating to the printing machine 15. The operating system 26 is connected to a user interface 28 that enables use of the screen display 12, the keyboard 13, and the pointing unit 14 for generating a desired output file shown on the screen display 12, with the aid of the graphics commands 31. Finally, the operating system 26 is connected to a print driver 34. The print driver 34 is connected to a communication port or com port 36 which is connected to one end of the communication bus 16. The communication interface 32 is also connected to the com port 36.

With reference now to FIG. 4, a tape cartridge or cassette 24 is illustrated. The tape cartridge 24 illustrated in FIG. 4 is illustrative or exemplary of a tape cartridge. Tape cartridges which are useable in conjunction with the present invention may come in a number of forms or arrangements. A representative example is described in U.S. Pat. No. 5,078,523.

Generally, a tape cartridge or cassette 24 includes a supply roll 40 supported by structure 42 and a frame 44. As will be recognized by those familiar with the art, any type of supply roll 40 can be used on a cartridge, such as, for example, label rolls, poster rolls, tape, or the like. The supply roll 40 is supported such that it can be rotated about its longitudinal axis to dispense paper therefrom. The frame 44 allows for paper to be dispensed from the supply roll 40 through an opening or slot (not shown) defined in the frame 44. For use in a thermal printing machine, a cartridge 24 typically also includes structure 46 for supporting an image carrying ribbon supply. The image carrying ribbon supply dispenses image carrying ribbon as it is unwound from its spool. The free end of the ribbon is guided by the frame to a take-up spool. The supply roll 40 and ribbon are disposed so that in at least one predetermined location, they are in face-to-face alignment. At a predetermined location, the cartridge 24 includes an opening which receives a transfer head and a platen when the cartridge is mounted on a printing machine.

In the embodiment illustrated in FIG. 4, frame 44 carries a memory circuit component 22, which will be described in greater detail below. At this point, it is adequate to understand that memory circuit component 22 includes a first contact surface 48. Additionally, memory circuit component 22 has a second contact surface 50 which, in the embodiment illustrated in FIG. 4, is generally parallel to and spaced from first contact surface 48 and is not visible in FIG. 4. In the embodiment of FIG. 4, a contact surface extension 52 is in electrical contact with second contact surface 50 and extends laterally outward from the memory circuit component to provide access to the contact surface extension 52. Contact surface extension 52 is preferably of some electrically conductive material, such as copper.

FIG. 5 illustrates cartridge 24 inserted in a printing machine 15. The printing machine 15 is depicted relatively schematically. The exact manner in which the tape cartridge engages the printing machine is of little concern to the present invention, as long as they are compatible, and structure is provided for electrical connection between the two.

Generally, a printing machine of the type relevant to this application typically includes structure 54 for receiving a cartridge 24. The printing machine 15 further typically would include a driving mechanism (not shown) to advance the supply roll and/or the ribbon in the cartridge 24. A thermal print head (not shown) is provided in the printing machine and is arranged to cooperate with the supply roll 40 of the cartridge 24 such that the thermal print head can print characters or symbols onto the supply roll 40. A representative example of this is described in U.S. Pat. No. 5,078,523.

More specifically, a gear mechanism within the printing machine urges a platen into close abutting relation with the supply roll and ribbon captured between the platen and a transfer head. Circuitry in the printing machine drives the platen to advance the supply roll and ribbon. When a desired character is input by an operator, the electronics of the machine energizes pixels on the thermal transfer head as the supply roll and ribbon advance past the head. When a command to print a letter is given, a step motor actuates the platen. The head pixels are variously energized to imprint the letter on the tape. A representative example of this type of printing is described in U.S. Pat. No. 5,078,523.

The printing machine 15 typically includes a keyboard by which the user is able to selectively input the characters or symbols desired to be printed. Typically the machinery 15 will include a display, such as an LCD display, which shows the user what characters or symbols have been typed, so that, for instance, mistakes can be corrected prior to printing.

FIG. 3 is a block diagram of the electrical components and selected parts of the printing machine 15. The printing machine 15 has a processor 17 operatively connected to memory 18, a user interface 19, a communication interface 20 and the memory circuit component 22. The memory circuit component 22 is schematically shown attached to the cartridge 24. Also, the communication interface is operatively connected to a communication port or com port 21 for receiving and transmitting electronic signals to the computing device 11 via the communication bus 16.

In a preferred embodiment, the com ports 36 and 21 of the computing device 11 and the printing machine 15, respectively, are RS-232 serial ports. RS-232 serial connections are standard, commercially available communication implementations in the industry. RS-232 serial connections provide standard bi-directional, synchronous communication between the computing device 11 and the printing machine 15. When using RS-232 serial ports, it is preferable if the transmission rate is above 9600 bits per second (bps) because communication speed between the computing device 11 and the printing machine 15 is critical if graphical printing is done, as graphical printing generally requires large file transmissions. It will be apparent to one skilled in the art that other communication connections can be utilized, such as, for example, an IEEE 1284 Centronics parallel port. Finally, it will be appreciated that with serial communications, appropriate hardware and software handshaking will be implemented to control the data flow between the computing device 11 and the printing machine 15.

The processor 17 and its associated memory 18 can be of any type well known in the art. Detailed descriptions thereof will not be included herein, it being understood from the broad descriptions provided herein that those skilled in the art would be able to configure appropriate processor networks to accomplish the principles of this invention as further described. In a preferred embodiment, the processor 17 is a 16-bit microprocessor from NEC Electronics Inc. and referenced as μPD70208 (V40). Similarly, the user interface 19 can be configured in any number of ways known in the industry to allow a user to manually control the printing machine 15.

It will be appreciated that the electrical components shown in FIG. 3 are programmed to perform other standard functions as well, such as, for example conveying the user's input characters and symbols to the thermal print head.

The memory circuit component 22 is physically attached to the cartridge 24 and is electrically connected to the processor 17. The printing machine 15 includes a bi-directional signal flow path 23 that terminates in first and second contact surfaces 55 and 56 (shown in FIGS. 4 and 5). One of these contacts 55 engages the first contact surface 48 of the memory circuit component 22. In the embodiment illustrated in FIGS. 4 and 5, first contact surface 48 is formed of a spring leaf-like member. The second contact 56 of the printing machine circuitry contacts the contact surface extension 52 located on the cartridge frame 44. Thus, when cartridge 24 is inserted into the printing machine 15, the memory circuit component 22 becomes a part of the electrical circuitry as illustrated in the electrical block diagram of FIG. 3.

Figure 6:
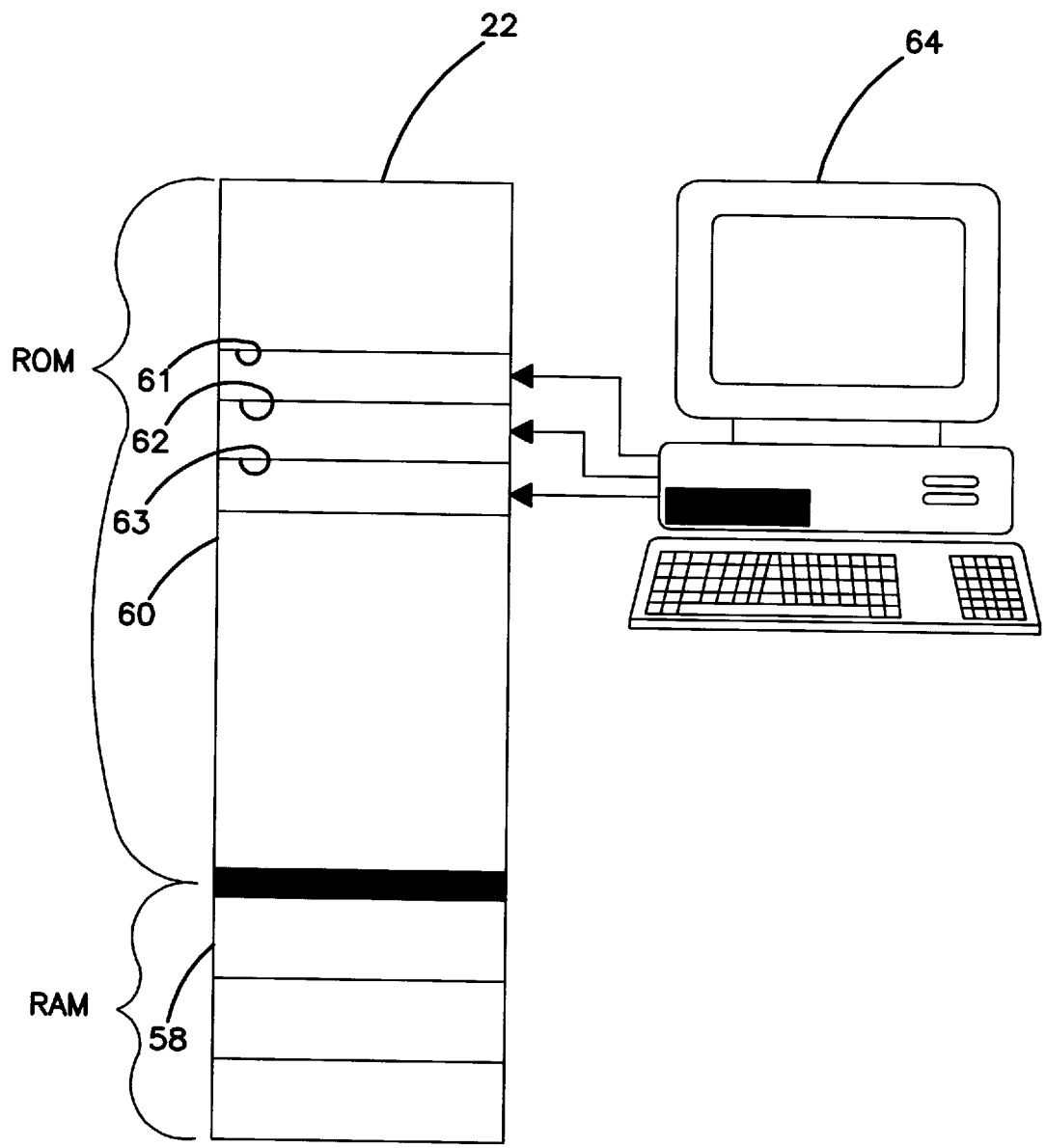
FIG. 6 is a schematic diagrammatic representation of the memory circuit component of FIGS. 4 and 5, with arrowed lines indicating flow of information between a memory circuit component and a computing device.

The memory circuit component 22 is of the type possessing a read only memory (ROM) section, as well as a random access memory (RAM) section. An example of a memory circuit component 22 that is commercially available is the DS 1992 Touch Memory, made by Dallas Semi conductor of Dallas, Tex. The read only memory portion, illustrated in FIG. 6 at reference numeral 60, includes a plurality of addresses in which data can be stored. The RAM portion 58 of the memory circuit component 22 similarly has a plurality of addresses for storing information. Because section 58 is random access, information can be written into and read from the addresses in the RAM section of the memory circuit component 22. Three exemplary ROM memory addresses are given by reference numbers 61, 62 and 63. During manufacturing, a computing device 64 can be used to write into those addresses various data representing parameters of the supply roll 40. The supply roll parameter data written to ROM 60 of the memory circuit component 22 will vary depending on the type of supply roll 40 carried on the cartridge 24.

In the preferred embodiment of the present invention, the following information is written to the ROM 60 of the memory circuit component 22 for die-cut label supply rolls:

TABLE 1

| Number of Bytes | Element Description |
| --- | --- |
| 2 | ID number to identify appropriate template |
| 1 | Die-cut label type |
| 1 | Default text direction (up, down, right, left) |
| 1 | Number of vertical labels on supply |
| 4 | Minimum x (horizontal) unprintable leader/trailer |
| 4 | Printable x distance (length) of one label |
| 4 | Printable y distance (height) of one label |
| 4 | Actual y distance of liner |
| 4 | x gutter between labels |
| 4 | y gutter between labels |
| 4 | x distance between timing holes |
| 4 | y distance from center of liner to bottom of lowest label |
| 4 | Remaining length of supply |
| 1 | Shape (rounded rectangle, circle, diamond, triangle, rectangle) |
| 3 | Color of substrate |
| 1 | Number of ribbon colors |

TABLE 1-continued

| Number of Bytes | Element Description |
|---|---|
| 3 | Color of first ribbon |
| 3 (n − 1) | Colors of remaining ribbons (n = total number of ribbon colors) |

All of the above elements, contained on the memory circuit component 22, are transmitted from the printing machine 15 to the computing device 11. In addition, the following elements are calculated and/or stored by the processor 17, and are also transmitted to the computing device 11 from the printing machine 15 in the preferred embodiment:

TABLE 2

| Number of Bytes | Element Description |
|---|---|
| 1 | On-line status |
| 1 | Length of this structure + length of extra ribbon RGB information in bytes |
| 1 | Machine type |
| 2 | Firmware Version number |
| 2 | VGL version number |
| 1 | Machine status |
| 1 | Print density (0–255) |
| 1 | Auto cut (off or on) |
| 1 | Can repeat last job (yes or no) |
| 16 | Supply name |
| 4 | Minimum top y (vertical) unprintable leader |
| 4 | Minimum bottom y (vertical) unprintable leader |
| 2 | x DPI of printer |
| 2 | y DPI of printer |

Operation

The computing device 11 communicates with the printing machine 15 in two modes. The first mode is common to computer systems having a computing device and a printing machine. When a print request has been initiated, the print driver 34 transmits electronic signals representing printable data to the printing machine 15 through com port 36 via communication bus 16. This mode is essentially unidirectional.

The second mode of communication, however, involves bi-directional communication between the computing device 11 and the printing machine 15. The application program 30 first determines whether the com port 36 is available (i.e., not being used by the print driver 34). Once the com port 36 is available, the communication interface 32 establishes exclusive control over the com port 36. While the application program 30 is running, the communication interface 32 polls the printing machine 15 at predetermined intervals of time. In a preferred embodiment, the interval is defined as four seconds. Every four seconds, the communication interface 32 sends electronic signals through the com port 36 to the printing machine 15, via the communication bus 16, requesting information about the supply roll 40 currently loaded in the printing machine 15, error conditions, and other operational characteristics.

The communication interface 20 in the printing machine 15 processes the electronic signals sent by the computing device 11 and transmits the electronic signals to the processor 17. If the request is valid (i.e., if it is not interjected into a stream of printable characters), the processor 17 retrieves the data stored on the memory circuit component 22. In a preferred embodiment, the retrieved data is shown in Table 1. The processor 17 may then retrieve other data from the memory 18 and the memory circuit component 22, and may perform some calculations to obtain the data shown in Table 2. The data, including supply roll parameter data retrieved from the memory circuit component 22, is transmitted in the form of electronic signals by the communication interface 20 to the computing device 11 via the communication bus 16.

The communication interface 32 of the computing device 11 receives the electronic signals transmitted from the printing machine 15 representing real-time data about the supply roll 40 currently loaded in the printing machine 15, error conditions and other operational characteristics. The supply roll parameter data is formatted on the screen display 12 to proportionately match the actual dimensions and color of the supply roll 40 loaded in the printing machine 15.

The user can then edit the output file, using the keyboard 13 or the pointing unit 14, while viewing the formatted data display, to generate a desired output file. The graphics commands 31 enable the user to add text, graphics, or a combination of both to the output file. The user is able to view the output file on the screen display 12 exactly as it will be printed on the supply roll 40.

Figure 7:
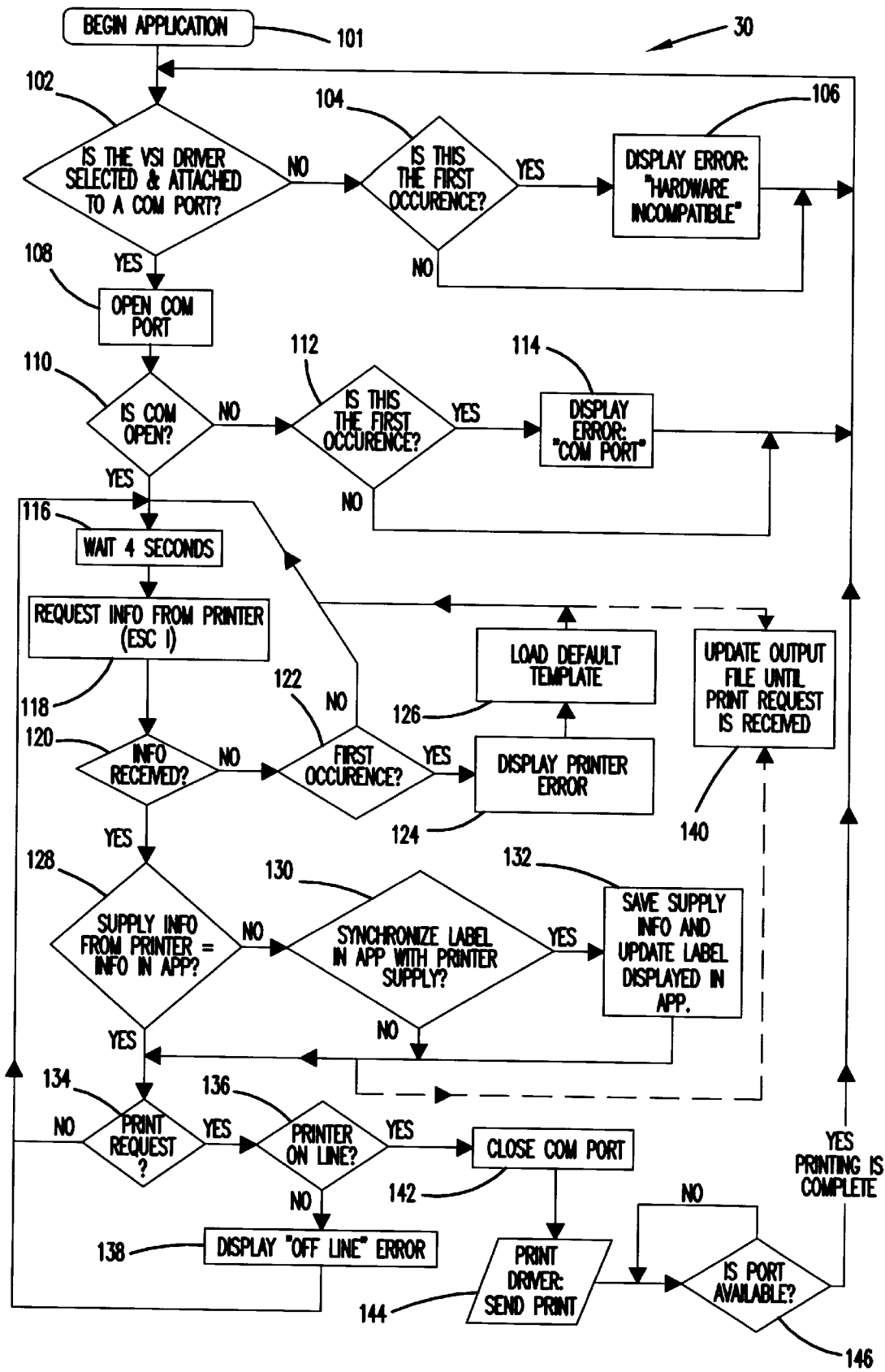
FIG. 7 is a flow chart of a preferred embodiment of an algorithm for a computing device of a computer system according to the present invention for communication to a printing machine of the computer system.
Figure 8:
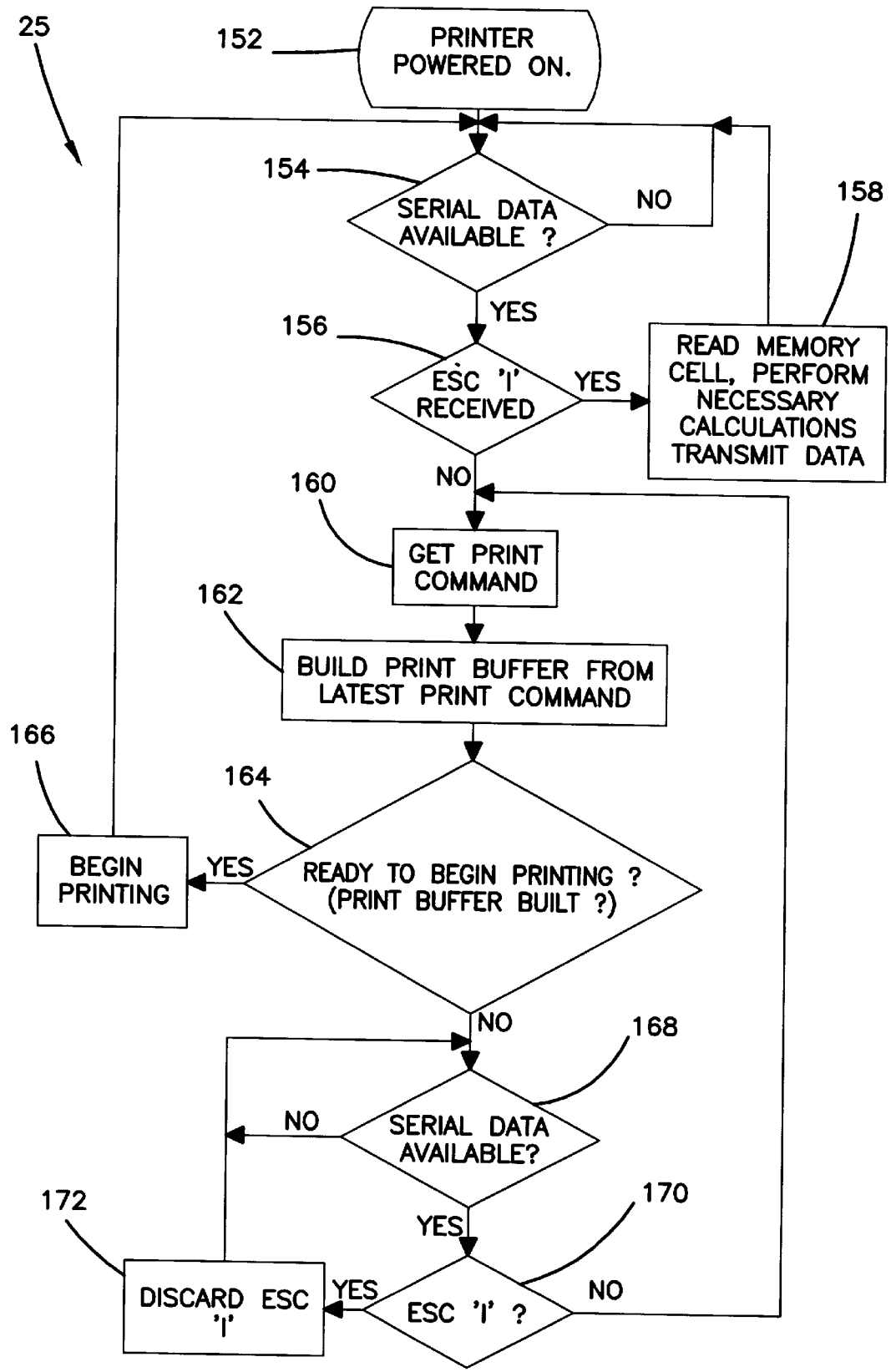
FIG. 8 is a flow chart of a preferred embodiment of an algorithm for a printing machine of a computer system according to the present invention for communication to a computing device of the present invention.

Turning now to the logic flow of a preferred embodiment of the computer system 10, FIGS. 7 and 8 are flow charts showing the general program flow for the application program 30 of the computing device 11 and the control routine 25 of the printing machine 15, respectively. It will be appreciated that references to the logic flow of the application program 30 include the communication interface 32 which is essentially an interrupt routine that runs while the user has control to generate output files through the screen display 12, using graphics commands 31. The object code for the application program 30 is stored in the memory 27 of the computing device 11. The object code for the control routine 25 is stored in the memory 18 of the printing machine 15. It will be apparent to those in the art that the application program 30 is platform independent. That is, the application program 30 can be implemented on any computer-based system that can output the proper commands. One preferred embodiment is implemented on a personal computer with sufficient hardware capabilities, running Microsoft® Windows® 95 type of operating system.

Upon start up of the application program 30 in the computing device 11, by actuating the appropriate icon or by otherwise executing the appropriate executable module, the application program 30 begins (101). First, the application program 30 determines whether the computing device 11 has selected a valid print driver attached to a valid com port (102). If not, the application program 30 determines if this is the first occurrence of such an error (104). If it is the first error occurrence, then the appropriate hardware error message is displayed (106) and control passes to the beginning of the application program 30. If it is not the first occurrence of an error (104), then the error message has already been displayed and control passes to the beginning of the application program 30.

If a valid print driver 34 is selected and attached to a valid com port 36, the application program 30 attempts to open the com port 36 (108). A com port check is performed to insure that the com port 36 was successfully opened (110). If the com port 36 was not opened successfully, the application program 30 determines if this is the first com port error (112) and if so, displays an appropriate error message (114) and passes control back to the beginning of the application program 30. If it was not the first com port error, an appropriate error message has already been displayed and control is passed directly back to the beginning of the application program 30.

If the com port 36 was successfully opened, the application program 30 begins an interval loop portion of the program, continuously attempting communication with the printing machine 15 at predetermined intervals while the application program 30 is running. In a preferred embodiment, the predetermined interval is four seconds (116). At each predetermined interval period, an escape I ("ESC I") command is sent to the printing machine 15 (118). It will be apparent that the intervals could be defined at an alternative interval period and that an alternative command could be designated for requesting data from the printing machine 15.

After each time the ESC I command is sent (118), the application program 30 determines whether data was received from the printing machine 15 in response to the ESC I command (120). If data was not received from the printing machine 15, the application program 30 determines whether this is the first occurrence of no data being received (122). The first time that no data is received from the printing machine 15 in response to an ESC I command, the appropriate message is displayed (124), notifying the user that supply roll parameter data is not available and therefore bi-directional communication for retrieving supply roll parameters will be disabled until such data is available on the system. A default template is then loaded and displayed (126) for the user to generate an output file. Control then passes to the user to create and/or edit the output file displayed on the screen display 12 (140) using the graphics commands 31. In a preferred embodiment, even though bi-directional communication is not available or is disabled due to some error in the system 10, the application program 30 can still be used with default templates which the user can use to generate output files. Basic printing services are provided to the printing machine 15, but without the aid of supply roll parameters for helping to format output files.

If it is not the first occurrence of receiving no data from the printing machine 15 (122), then the appropriate message has already been displayed and control passes to the user to create and/or edit the output file displayed on the screen display 12 (140) using the graphics commands 31. After control is passed to the user (140), the application program 30 simultaneously continues to perform the interval loop, requesting information from the printing machine 15 by sending ESC I commands at four second intervals (116, 118).

If information is received from the printing machine 15 in response to an ESC I command (120), then the parameter data pertaining to the supply roll 40 is compared to the data currently stored in the computing device 11 (128). If the supply roll parameter data just received is not the same as the data stored in the computing device 11, then the application program 30 prompts the user to determine whether to update, or synchronize, the output file with new supply roll parameter data received from the printing machine 15 (130). The user may then update the output file displayed on the screen display 12 (132) with the new supply roll parameter data (132). Alternatively, the user may decline to update the output file with the new supply roll parameter data. Regardless of the user's decision, however, control then passes to the user to edit the output file displayed on the screen display 12 (140) using the graphics commands 31. This check loads supply roll parameter data the first time it is received after the start-up of the application program 30. This check also insures that a cartridge 24 with a different supply roll 40 has not been installed in the printing machine 15 without the user's knowledge while the user is creating and/or editing an output file. Finally, this check allows a user to change the supply roll 40 loaded in the printing machine 15 while the user is creating and/or editing an output file and to update the displayed output file with the new supply roll parameter data.

As the user edits the output file, the application program 30 simultaneously continues execution. The application program 30 first determines whether there has been a print request (134). If a print request is not received, the application program 30 continues to poll the printing machine 15 with ESC I commands at four second intervals (116, 118). If a print request is received (134), the application program 30 determines whether the printing machine 15 is on-line (136). If the printing machine 15 is not on-line, then an error message is displayed (138) and control is passed to the beginning of the interval loop of application program 30. If the printing machine 15 is on-line (136), the com port 36 is closed (142) and control is passed to the print driver 34 (144) to send printable data to the printing machine 15. After the print driver 34 begins sending print commands to the printing machine 15 (144), the application program 30 checks whether the com port 36 is available (146) and continues checking until it becomes available again. Once the com port 36 is available to receive ESC I commands again (146), control is passed back to the beginning of the application program 30.

Referring to FIG. 8, the control routine 25 of the printing machine 15 is shown in flow chart format. After the printing machine 15 is powered on (152) the control routine 25 determines whether serial data is available (154). If no data is available, the control routine 25 continues checking (154) until serial data becomes available. Once serial data is available, the control routine 25 determines whether an ESC I command has been received (156). If an ESC I command has been received, then data representing the supply roll 40 is read from the memory circuit component 22, any necessary calculations are performed, and the data is transmitted to the computing device 11 (158). Also, if no data is retrieved from the memory circuit component 22, or if only certain data is retrieved from the memory circuit component 22, then the processor 17 retrieves default template data from the memory 18 and transmits the data to the computing device 11 (158). Control is then passed to the beginning of the control routine 25. If an ESC I command is not received (156), then the control routine 25 retrieves the print command (160) and builds the print buffer with the received print command (162). The control routine 25 determines whether the print buffer has been built and is ready to begin printing (164). If so, printing begins from the print buffer (166). While printing continues, control is passed to the beginning of the control routine 25 so that the control routine 25 can continue checking for additional data and ESC I commands. If the print buffer is not built (164), then the control routine 25 determines whether serial data is available (168). If serial data is not available, the routine 25 continues to check for serial data until it becomes available (168). Once serial data is available, the control routine 25 determines whether an ESC I command has been received (170). If an ESC I command has been received, the ESC I command has been received in the middle of a stream of printable characters and therefore is discarded (172). The control routine 25 then continues to check for serial data. Once serial data other than an ESC I command is available, the control routine 25 retrieves the print command and continues building the print buffer (160, 162) until the print buffer is built and printing begins (166).

It is to be understood that even though numerous characteristics and advantages of the present invention have been set forth in the foregoing description, together with details of the structure and function of the invention, the disclosure is illustrative only, and changes may be made in detail, especially in matters of logic flow and arrangement of parts, within the principles of the invention to the full extent indicated by the broad general meaning of the terms in which the appended claims are expressed.

What is claimed is:

1. A computer system for utilizing data representing parameters of a supply roll, the supply roll being retained on a cartridge detachably loaded in a printing machine to permit a user to create a desired output on a display device of a computing device, said printing machine operatively connected to a communication port of said computing device for bi-directional communication therebetween, said computer system comprising:

a memory circuit component attached to said cartridge and including a plurality of memory addresses for storing said supply roll parameter data in said plurality of memory addresses, said memory circuit component being electrically connected to said printing machine;

first program means stored in said computing device for transmitting first electronic signals to said printing machine, said first electronic signals representing requests for said supply roll parameter data;

second program means stored in said printing machine for receiving said first electronic signals from said computing device, for retrieving said supply roll parameter data from said plurality of memory addresses in said memory circuit component in response to said first electronic signals received from said computing device, and for transmitting second electronic signals representing said supply roll parameter data retrieved from said plurality of memory addresses in said memory circuit component;

said first program means further including means for receiving said second electronic signals representing supply roll parameter data and for formatting said supply roll parameter data to create and display on said display device a digitized pattern corresponding to said supply roll; and data creation means for permitting said user to create a desired output on said display device while said digitized pattern is displayed on said display device, said data creation means displaying said desired output with said digitized pattern on said display device.

2. A computer system according to claim 1 wherein said memory circuit component is mechanically attached to said cartridge.

3. A computer system according to claim 1 wherein said data creation means includes editing commands for permitting said user to generate said desired output through a data input unit of the computing device.

4. A computer system according to claim 3 wherein said editing commands are capable of producing graphical output data.

5. A computer system according to claim 1, with said communication port having a first state and a second state, with said first program means having exclusive control of said communication port in said first state for transmitting said electronic signals to printing machine through said communication port, and with said first program means having at least partially restricted control of said communication port in said second state.

6. A computer system according to claim 5, wherein said first program means transmits said electronic signals requesting supply roll parameter data at predetermined intervals when said communication port is in said first state.

7. A computer system according to claim 1 wherein said second program means further comprises means for printing said desired output to said supply roll loaded in said printing machine such that the desired output printed on said supply roll appears substantially the same proportionally as the desired output displayed with said digitized pattern on said display device.

8. A computer system according to claim 1 wherein said printing machine further includes means for printing said desired output onto said supply roll loaded in said printing machine such that the desired output printed on said supply roll appears substantially the same proportionally as the desired output displayed with said digitized pattern on said display device.

9. A computer-based method for creating a desired output, said method comprising the steps of:

providing bi-directional communication between a computing device and a printing machine;

providing a cartridge detachably loaded in said printing machine, said cartridge retaining a supply roll and having a memory circuit component attached thereto, said memory circuit component including a plurality of memory addresses with data representing parameters of said supply roll stored therein, said memory circuit component being electrically connected to said printing machine;

providing first electronic signals from said computing device to said printing machine, said first electronic signals representing requests for said supply roll parameter data;

receiving said first electronic signals from said computing device;

retrieving said supply roll parameter data from said plurality of memory addresses in said memory circuit component in response to said first electronic signals received from said computing device;

providing second electronic signals from said printing machine to said computing device, said second electronic signals representing said supply roll parameter data;

receiving said second electronic signals from said printing machine;

formatting said supply roll parameter data into a digitized pattern corresponding to said supply roll;

displaying said digitized pattern on a display device of said computing device; and displaying a desired output with said digitized pattern on said display device, said desired output created by said user while said digitized pattern is displayed on said display device.

10. A method according to claim 9 further comprising the step of providing a data input unit for receiving editing commands from a user for creating said desired output.

11. A method according to claim 10 wherein said editing commands includes commands for producing graphical output data.

12. A method according to claim 9 further comprising the step of printing said desired output to said supply roll loaded in said printing machine such that the desired output printed on said supply roll appears substantially the same proportionally as the desired output displayed with said digitized pattern on said display device.

13. A computer printing system for creating a desired output corresponding to a desired supply roll, said computer printing system comprising:

a computing device including a display device for displaying said desired output created by a user;

a printing machine for printing said desired output on a supply roll retained on a cartridge detachably loaded in said printing machine;

a memory circuit component attached to said cartridge and including a plurality of memory addresses for storing data representing parameters of said supply roll, said memory circuit component being electrically connected to said printing machine;

means for providing bi-directional communication between said computing device and said printing machine;

said computing device further including:

means for providing first electronic signals from said computing device to said printing machine, said first electronic signals representing requests for said supply roll parameter data stored in said plurality of memory addresses in said memory circuit component;

means for receiving second electronic signals from said printing machine, said second electronic signals representing said supply roll parameter data;

means for formatting said supply roll parameter data into a digitized pattern corresponding proportionally to said supply roll;

means for displaying said digitized pattern on said display device of said computing device; and input and display means for permitting a user to create said desired output on said display device while said digitized pattern is proportionally displayed on said display device; and said printing machine further including:

means for receiving said first electronic signals from said computing device;

means for retrieving said supply roll parameter data from said plurality of memory addresses in said memory circuit component; and means for providing second electronic signals from said printing machine to said computing device.

14. A computer system according to claim 13 wherein said memory circuit component is mechanically attached to said cartridge.

* * * * *